United States Patent [19]
Graham et al.

[11] 3,936,130
[45] Feb. 3, 1976

[54] PLUG-IN FUSE RECEPTACLE INTERCHANGEABLE WITH CIRCUIT BREAKER

[75] Inventors: Albert Graham, Toronto; Norman Henry McCullough, Weston, both of Canada

[73] Assignee: I-T-E Circuit Breaker (Canada) Limited, Canada

[22] Filed: July 1, 1974

[21] Appl. No.: 484,682

[52] U.S. Cl. .............................. 339/125 R; 339/180
[51] Int. Cl.² ............................................ H02B 1/02
[58] Field of Search ............ 339/125 R, 125 L, 167, 339/180, 182 R, 182 L

[56] References Cited
UNITED STATES PATENTS

| | | |
|---|---|---|
| 951,455 | 3/1910 | Rooney .............................. 339/180 |
| 1,841,638 | 1/1932 | Schmidt .............................. 339/180 |
| 2,385,727 | 9/1945 | Platz .................................. 200/308 |
| 2,428,322 | 9/1947 | Robertson .......................... 317/119 |
| 2,757,353 | 7/1956 | Opalenik ......................... 339/125 L |
| 3,767,977 | 10/1973 | Bachman ............................ 317/119 |
| 3,783,435 | 1/1974 | Fisher ................................ 339/180 |

Primary Examiner—Roy Lake
Assistant Examiner—Mark S. Bicks
Attorney, Agent, or Firm—Ostrolenk, Faber, Gerb & Soffen

[57] ABSTRACT

An Edison base fuse receptacle is provided for interchanging with a Push-Push type 1½ inches wide circuit breaker. In another embodiment the fuse receptacle is constructed to be interchangeable with three narrow plug-in type circuit breakers.

9 Claims, 11 Drawing Figures

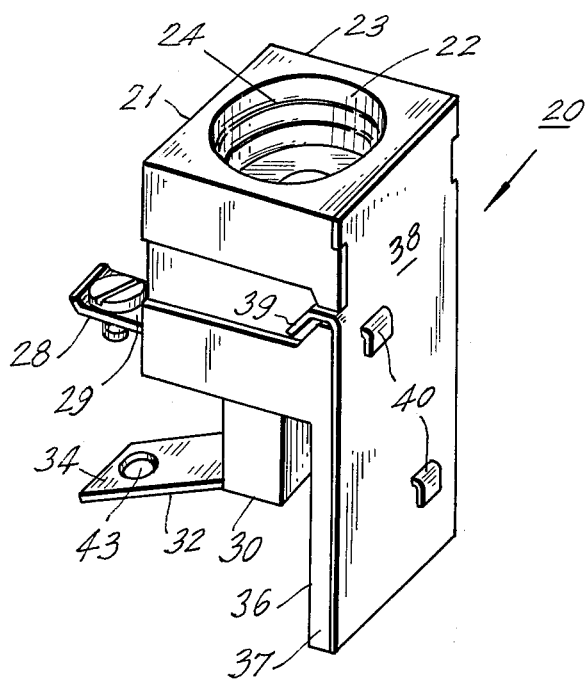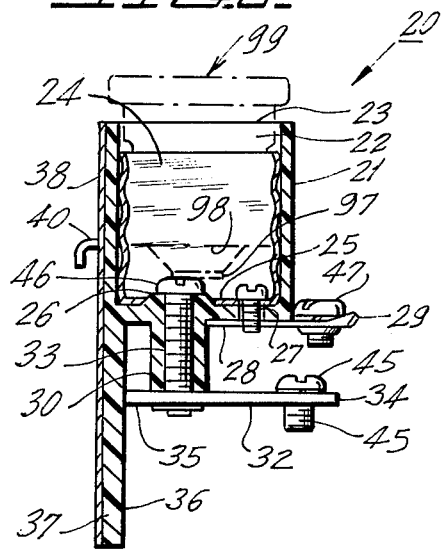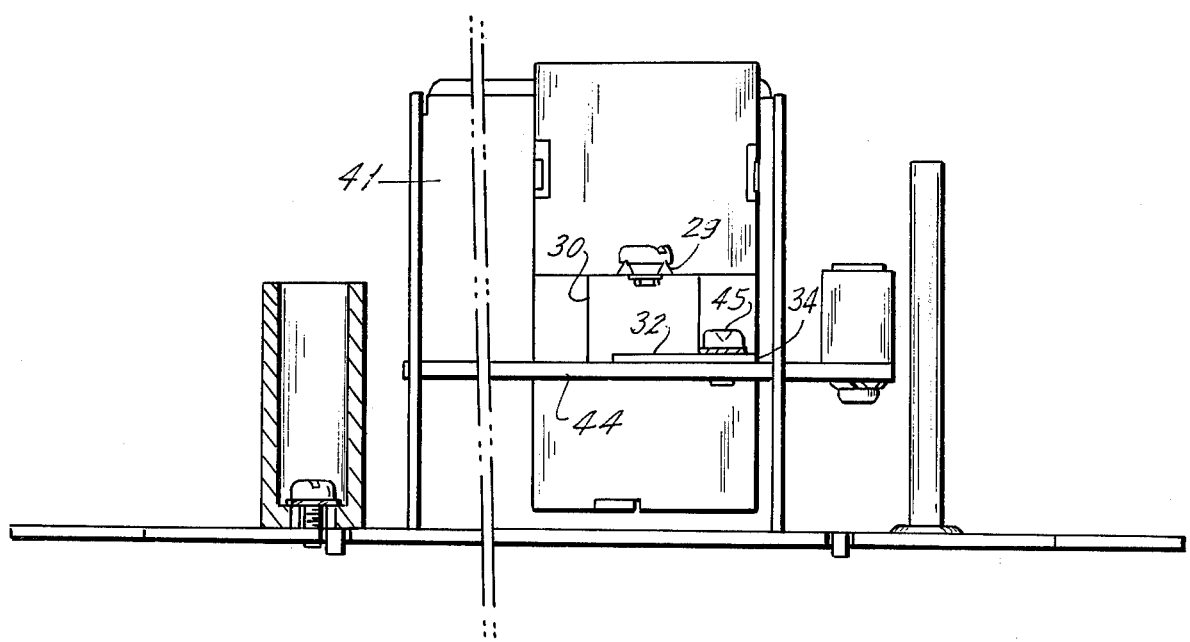

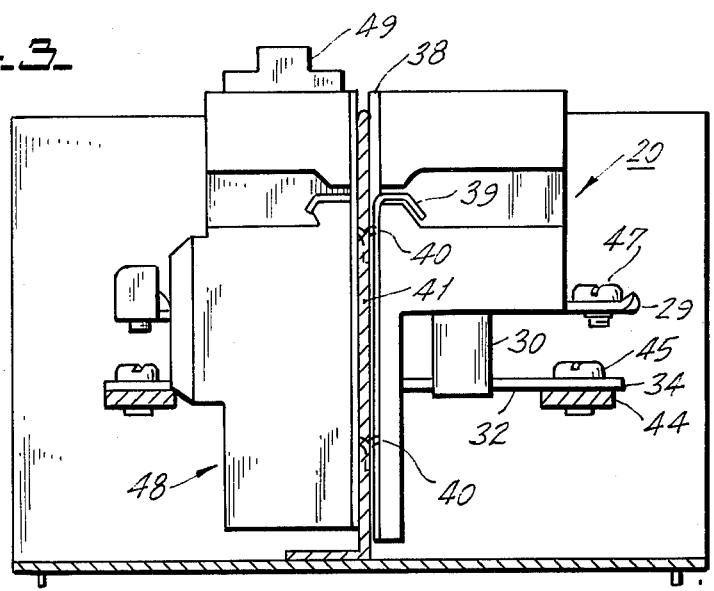
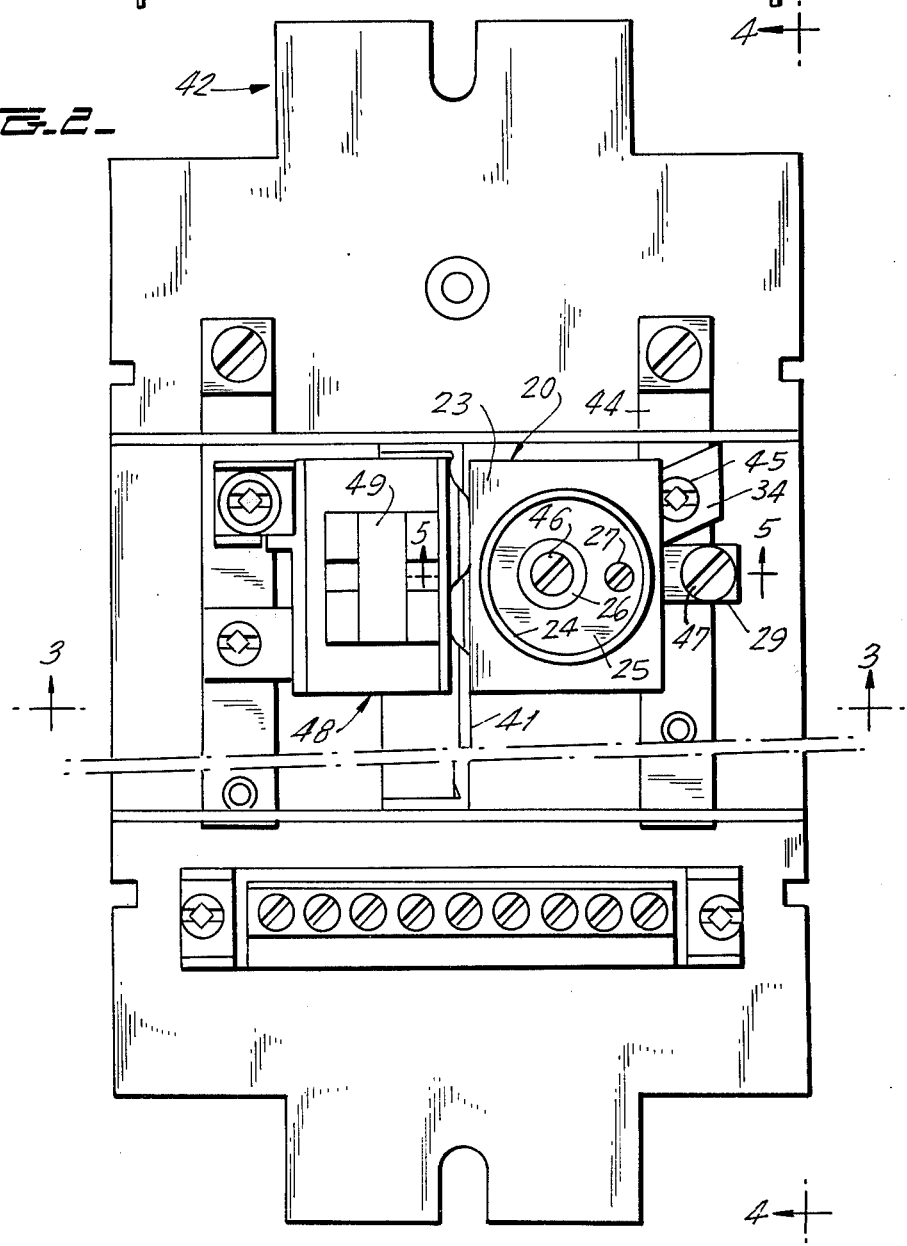

PLUG-IN FUSE RECEPTACLE INTERCHANGEABLE WITH CIRCUIT BREAKER

This invention relates to fuse receptacles in general and more particularly relates to fuse receptacles that are interchangeable with circuit breakers and are mountable in a panelboard without the necessity of utilizing an adapter.

Utilization of automatic circuit breakers for protection of branch circuits in the home or at light industrial installations is becoming increasingly popular, and in some cases is mandatory. However, primarily because of economy, there are still many applications where screw-type fuses, commonly known as Edison base fuses, are utilized for branch circuit protection.

In accordance with the instant invention, the same electric distribution panel is utilized for circuit breakers and/or fuse receptacles. This is accomplished by providing fuse receptacles so constructed that their line and load terminals as well as their overall dimensions permit installation in panelboards constructed for circuit breakers without the necessity of utilizing adapters of any sort for mounting the fuse receptacles in the panelboard.

Accordingly, a primary object of the instant invention is to provide fuse receptacles that are interchangeable with circuit breakers.

Another object is to provide fuse receptacles of this type that occupy an integral number of circuit breaker spaces in a panelboard.

Still another object is to provide an Edison base fuse receptacle that is interchangeable with a 1½ inches wide push-push type circuit breaker.

A further object is to provide an Edison base fuse receptacle that occupies the panelboard spaces provided for three adjacent ½ inch wide plug-in type circuit breakers.

These objects as well as other objects of this invention will become readily apparent after reading the following description of the accompanying drawings in which:

FIG. 1 is a perspective of a fuse receptacle that is interchangeable with a circuit breaker having line and load terminals at the side thereof.

FIG. 2 is a plan view showing the fuse receptacle of FIG. 1 mounted in a panelboard together with a circuit breaker.

FIG. 3 is a cross-section taken through line 3—3 of FIG. 2, looking in the direction of arrows 3—3.

FIG. 4 is a side elevation looking in the direction of arrows 4—4 of FIG. 2.

FIG. 5 is a cross-section of the fuse receptacle taken through line 5—5 of FIG. 2 and looking in the direction of arrows 5—5.

Figure 6:
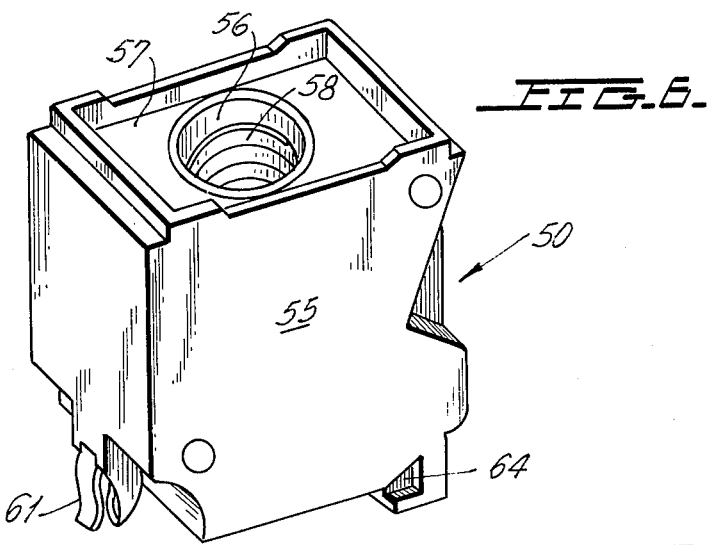
FIG. 6 is a perspective of a fuse receptacle having a plug-in type line terminal.

Now referring to the Figures and more particularly to FIGS. 1 through 5 wherein reference numeral 20 refers to a fuse receptacle which receives an Edison base fuse 99 shown in phantom in FIG. 5. The latter includes threaded terminal 98 approximately 1 inch in diameter and centrally disposed terminal 97 at the bottom thereof. More particularly, receptacle 20 includes body 21, molded of insulating material, having recess 22 extending downward from the top surface 23 of body 21. Disposed within recess 22 and resting against bottom wall 25 thereof is cylindrical metal socket 24 whose thin side wall is indented to form a screw thread that receives threaded fuse terminal 98. Bottom wall 25 is provided with clearance apertures that receive embossment 26 and screw 27. The latter extends through the bottom of body 21 and is engaged by a threaded aperture in load terminal strap 28 whose forward end 29 constitutes the load terminal for receptacle 20.

Hollow insulating post 30, aligned with embossment 26 and extending downwardly from the bottom 25 of body 21, spaces line terminal strap 32 from load terminal strap 28. Screw 33 extends through the center of post 30 and is received by a threaded aperture in line terminal strap 32 to secure the latter in operative position. Head 46 of screw 33 is disposed on the upper surface of embossment 26 and constitutes the line terminal portion engaged by central terminal 97 of the fuse 99. Forward end 34 of strap 32 constitutes the line terminal for socket 20. The other end 35 of strap 32 abuts the front surface 36 of thin insulating leg 37 that extends downward from body 21 along the rear thereof.

Metal plate 38, extending along the rear of receptacle 20 and leg 37, is secured to body 21 by ears 39. Plate 38 is provided with a pair of rearwardly extending downwardly facing hook-like formations 40 which, after being entered into apertures in panelboard circuit breaker mounting plate 41 (FIGS. 2–4) engage leg 41 to mechanically secure receptacle 20 to panelboard interior 42, so that aperture 43 in line terminal 34 is aligned with a threaded aperture in panelboard bus bar 44. Fastening screw 45 extends through aperture 43 and is received by a threaded aperture in bus bar 44 to make the line connection between receptacle 20 and panelboard interior 42. Screw 47 on load terminal 29 is provided as a wire grip for the conductor (not shown) extending from a load to the panelboard.

As seen best in FIG. 2, receptacle 20 is the same width as circuit breaker 48 and is a direct replacement therefor. Circuit breaker 48 is of the type described in U.S. Pat. No. 2,385,727 and panelboard interior 42 is of the type described in U.S. Pat. No. 2,428,320. In particular, circuit breaker 48 is provided with an operating mechanism so constructed that On and Off operations are achieved by successively depressing operating handle 49. The commercial version of circuit breaker 48 is 1½ inches wide. That is, circuit breaker 48 extends from 1½ inches along mounting rib 41. This is the same distance that receptacle 20 extends along mounting rib 41. Thus, body 21 is wide enough to accommodate the approximately 1 inch diameter socket 24 to receive an Edison type fuse.

Figure 7:
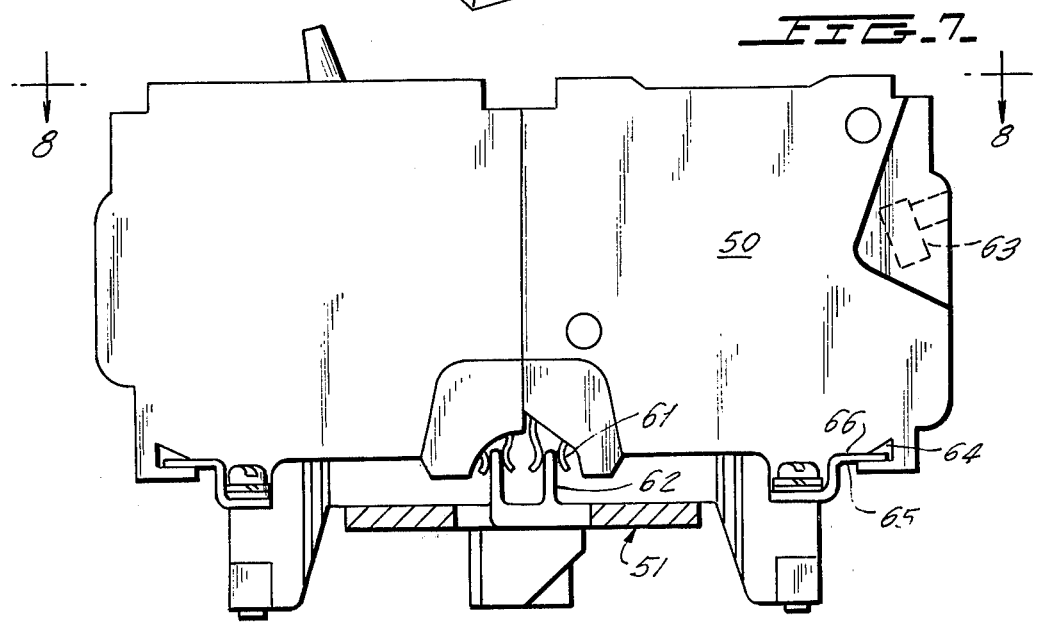
FIG. 7 is a side elevation illustrating the fuse receptacle of FIG. 6 mounted in a panelboard together with a circuit breaker.
Figure 8:
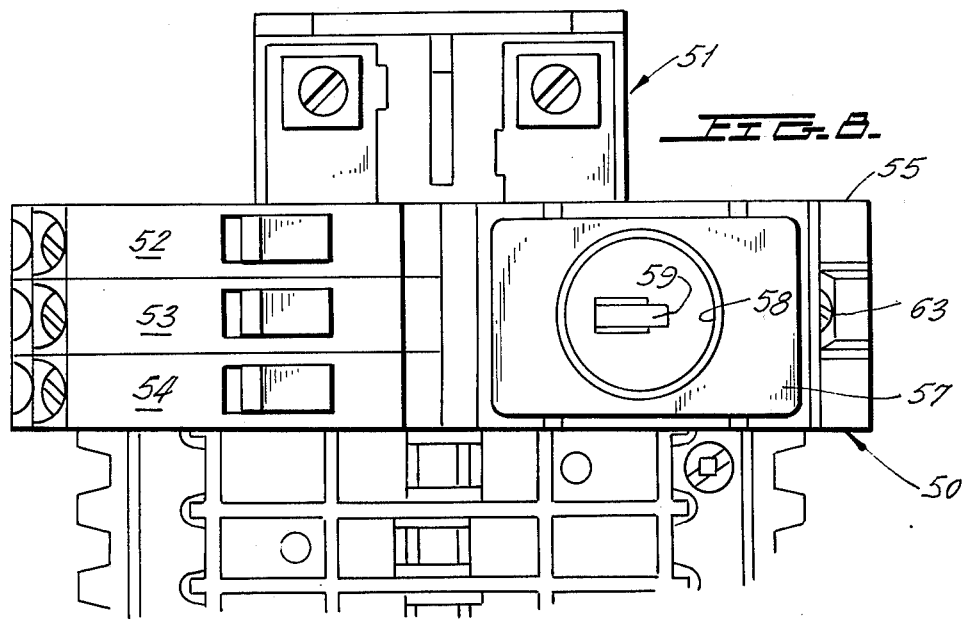
FIG. 8 is a plan view looking in the direction of arrows 8—8 of FIG. 7.

Now referring more particularly to FIGS. 6 through 8 which illustrate fuse receptacle 50 and the manner in which it mounts to panelboard interior 51 in place of three ½ inches wide single pole circuit breakers 52–54. For details of panelboard interior 51, reference is made to U.S. Pat. No. 3,767,977. Fuse receptacle 50 includes body 55, molded of insulating material, having recess 56 extending downward from upper surface 57. Disposed within recess 56 is threaded fuse receiving socket 58 engageable with one of the terminals of an Edison type fuse. At the bottom of recess 56 is disposed terminal 59, insulated from receptacles 58 and operatively positioned to be engaged by the central terminal of the Edison base fuse. Disposed at the rear lower portion of body 55 is female-type plug-in terminal 61 engageable with male-type plug-in line terminal stab 62 of panelboard interior 51, with this engagement being shown in FIG. 7. Line terminal wire grip 63 is disposed at the front end of body 55 intermediate the top and bottom thereof. Conducting elements (not shown) internal to body 55 provide electrical connections between line terminal 61 and fuse engaging central terminal 59, as well as between load terminal 63 and fuse engaging socket 58.

Disposed at the front lower portion of body 55 is a plurality of depressions 64 open at the fronts thereof to receive forwardly projecting fingers 65 on mounting ledge 66. Cooperation between depressions 64 and fingers 65 mechanically retains the load end of fuse receptacle 50.

Figure 9:
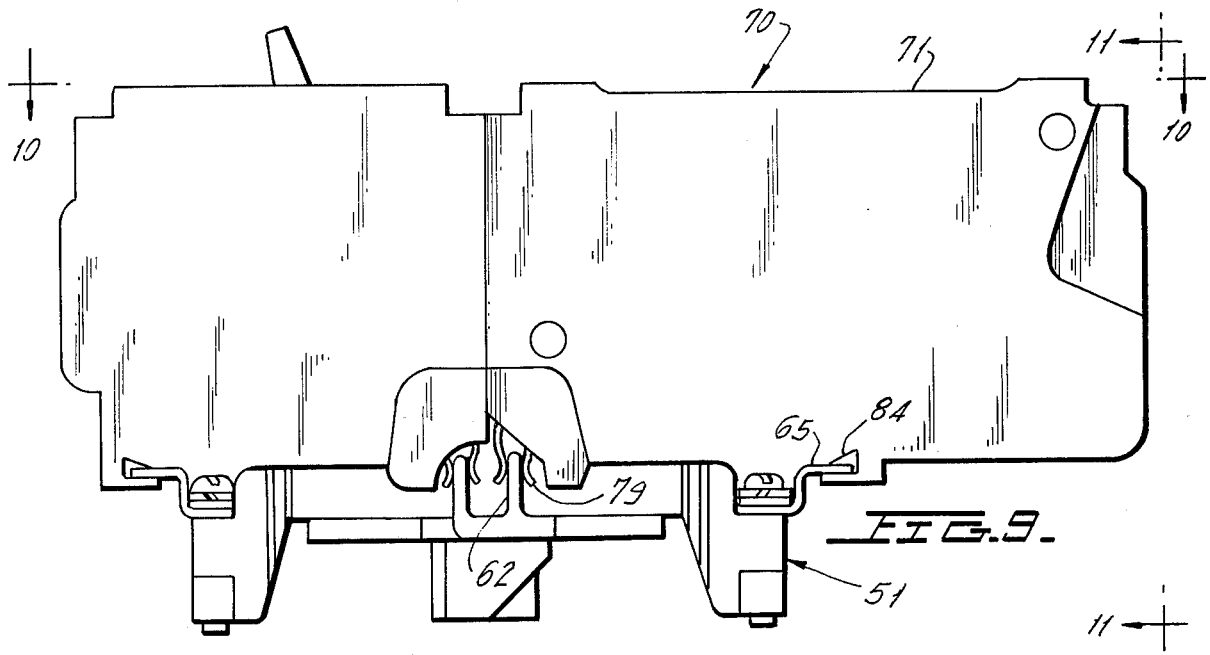
FIG. 9 is a side elevation, similar to that of FIG. 7, in which the single place fuse receptacle of FIG. 7 is replaced by a duplex receptacle.
Figure 10:
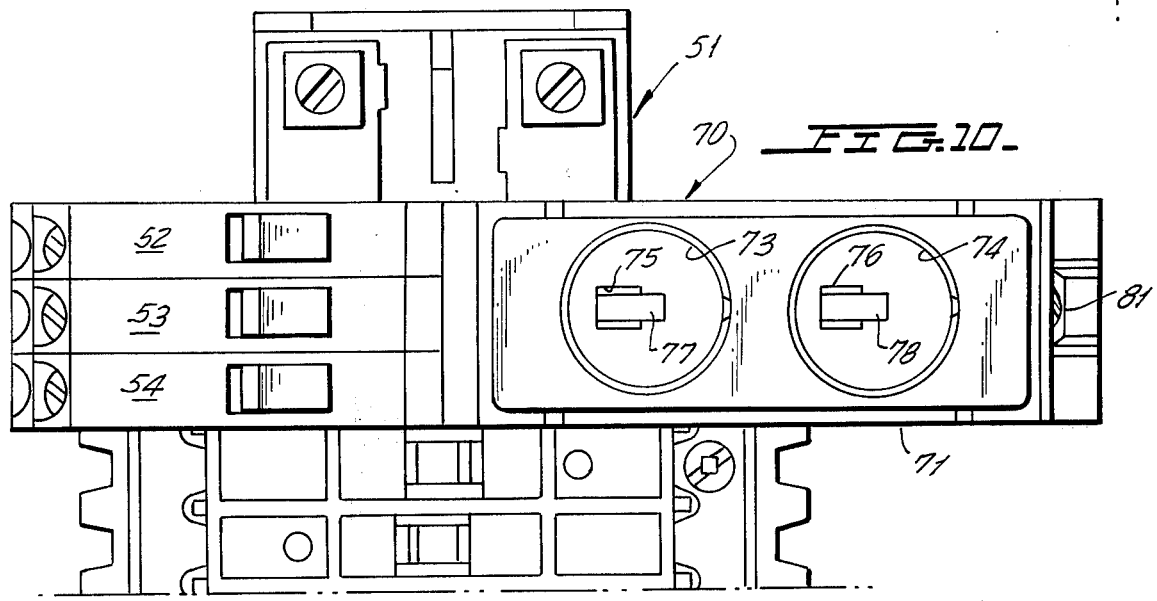
FIG. 10 is a plan view looking in the direction of arrows 10—10 of FIG. 9.
Figure 11:
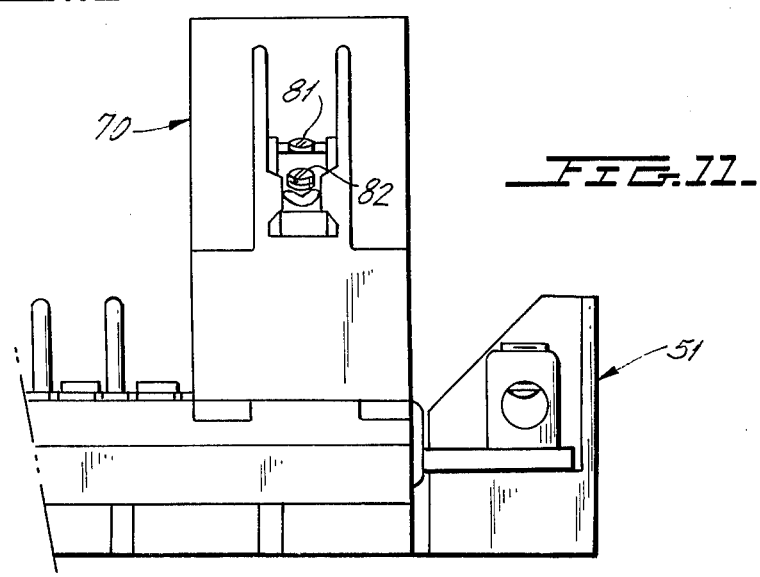
FIG. 11 is an end view looking in the direction of arrows 11—11 of FIG. 9.

In FIGS. 9 through 11 plug-in type duplex fuse receptacle 70 is shown mounted to panelboard interior 51 opposite three ½ inch wide breakers 52–54. Duplex receptacle 70 includes 1½ inch wide body 71, constructed of molded insulating material and having a pair of recesses wherein fuse receiving threaded sockets 73, 74 are disposed. Sockets 73, 74 are provided at their bottom surfaces with apertures 75, 76 respectively through which the respective fuse engaging line terminals 77, 78 extend. Conducting elements (not shown) disposed within body 71 electrically connect female type plug-in line terminal 79 to both terminals 77 and 78. Additional conducting elements (not shown), disposed within body 71, electrically connect socket 73 to upper load terminal 81 and connect socket 74 to lower load terminal 82. Both terminals 81, 82 are accessible at the forward end of body 71. Mounting recesses 84 to receive mounting fingers 65 are disposed at the bottom of body 71 intermediate the ends thereof.

Thus, it is seen that the instant invention provides novel constructions for Edison-type fuse receptacles that are interchangeable in place of plug-in type and bolted-type circuit breakers.

Although there have been described preferred embodiments of this novel invention, many variations and modifications will now be apparent to those skilled in the art. Therefore, this invention is to be limited not by the specific disclosure herein, but only by the appending claims.

The embodiments of the invention in which an exclusive privilege or property is claimed are defined as follows:

1. A fuse receptacle including an insulating generally rectangular parallelopiped body having a recess formed into an upper surface of the body and having at least one pair of opposed plane-surfaced sides, a screw-type socket disposed completely within said recess and constituting a first fuse engaging terminal, a second fuse engaging terminal disposed within said recess at the bottom thereof, first means external of said body for mechanically securing said receptacle to a circuit breaker mounting rib in a panelboard constructed to receive circuit breakers with one of said plane-surfaced body sides adjacently parallel to an exterior surface of said mounting rib, line and load terminals disposed externally of the remaining one of said pair of plane-surfaced sides and a bottom of said body, and second means conductively connecting said line and load terminals to the respective first and second fuse engaging terminals.

2. A fuse receptacle as set forth in claim 1 in which the first means includes hook-like formations initially outwardly extended beyond and thence formed parallel to only said one body side and opening away from said upper body surface and operatively positioned to engage coordinately sized apertures in said circuit breaker mounting rib in said panel board.

3. A fuse receptacle as set forth in claim 2 also including first and second conducting straps both disposed below said body and extended from the surface of said remaining one of said pair of body sides; said line and load terminals being disposed at end portions of the respective first and second straps disposed furthest from said body.

4. A fuse receptacle as set forth in claim 3 in which the first strap is disposed further from said upper body surface than is the second strap.

5. A fuse receptacle as set forth in claim 3 in which the body is provided with a hollow insulating post extended beyond the bottom thereof; said first strap abutting an end of said hollow post furthest from said body.

6. A fuse receptacle as set forth in claim 5 including a screw, constituting a portion of the second means, extending through the post and received by a threaded aperture in the first strap; said screw having a head constituting the first terminal.

7. A fuse receptacle as set forth in claim 5 in which the line and load terminals are offset sideways from each other as well as from top to bottom.

8. A fuse receptacle as set forth in claim 6 in which the body is provided with a thin downward extension along the rear edge thereof and adjacent the first means; said first strap having its end remote from said line terminal adjacent said extension.

9. A fuse receptacle as set forth in claim 8 in which the body is essentially the same width as a stack containing three circuit breakers.

* * * * *